US008548507B2

(12) United States Patent
Ko et al.

(10) Patent No.: US 8,548,507 B2
(45) Date of Patent: Oct. 1, 2013

(54) APPARATUS AND METHOD FOR RECEIVING SYSTEM INFORMATION IN MOBILE COMMUNICATION TERMINAL

(75) Inventors: Min-Suk Ko, Suwon-si (KR); Yang-Ick Joo, Seoul (KR); Woo-Sang Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 880 days.

(21) Appl. No.: 12/620,815

(22) Filed: Nov. 18, 2009

(65) Prior Publication Data
US 2010/0124919 A1    May 20, 2010

(30) Foreign Application Priority Data

Nov. 18, 2008 (KR) .................. 10-2008-0114443

(51) Int. Cl.
*H04W 68/00* (2009.01)
(52) U.S. Cl.
USPC ............... 455/458; 455/422.1; 455/426.1; 455/432.1; 455/435.1; 455/435.2
(58) Field of Classification Search
USPC ............. 455/458, 422.1, 426.1, 432.1, 435.1, 455/435.2
See application file for complete search history.

(56) References Cited

U.S. PATENT DOCUMENTS

| 6,628,946 B1* | 9/2003 | Wiberg et al. ........... 455/434 |
| 2006/0166693 A1* | 7/2006 | Jeong et al. ............. 455/525 |
| 2007/0191020 A1* | 8/2007 | Fischer et al. .......... 455/452.2 |

OTHER PUBLICATIONS

3GPP TS 36.331 V8.2.0 (May 2008); 3rd Generation Partnership Project; Technical Specification Group Radio Access Network; Evolved Universal Terrestrial Radio Access (E-UTRA) Radio Resource Control (RRC); Protocol specification (Release 8).*
3GPP TSG-RAN WG2 #64Tdoc R2-086420 Prague, Czech Republic, Nov. 10-14, 2008 Agenda Item: 6.2.1.6 Source: Ericsson.*

* cited by examiner

*Primary Examiner* — Lester Kincaid
*Assistant Examiner* — Dung Lam
(74) *Attorney, Agent, or Firm* — Jefferson IP Law, LLP

(57) ABSTRACT

An apparatus and a method for receiving system information in a mobile communication terminal are provided. In the method, system information including scheduling information for at least one additional system information is received from a base station. Whether validity of the system information is determinable is determined. If it is determined that the validity of the system information is not determinable, system information including scheduling information for at least one additional system information is received again from the base station.

19 Claims, 6 Drawing Sheets

APPARATUS AND METHOD FOR RECEIVING SYSTEM INFORMATION IN MOBILE COMMUNICATION TERMINAL

PRIORITY

This application claims the benefit under 35 U.S.C. §119(a) of a Korean patent application filed in the Korean Intellectual Property Office on Nov. 18, 2008 and assigned Serial No. 10-2008-0114443, the entire disclosure of which is hereby incorporated by reference.

BACKGROUND OF THE INVENTION

1. Field of the Invention

The present invention relates to an apparatus and a method for receiving system information of a base station in a mobile communication terminal. More particularly, the present invention relates to an apparatus and a method for receiving changing system information of a base station in a mobile communication terminal.

2. Description of the Related Art

When accessing a new cell during any one of an initial access, a cell selection, a cell reselection, or a handover, a terminal of a wireless communication system should receive system information of a cell to be accessed. For example, in the $3^{rd}$ Generation Partnership Project (3GPP) Long Term Evolution (LTE) standard, system information includes a Master Information Block (MIB), and System Information Blocks (SIBs) 1~N. A base station performs scheduling on each of the MIB and SIB1 on a transmission basis and transmits the same, and performs scheduling on SIB2~SIBN on a transmission basis called System Information (SI) and transmits the same.

A terminal determines information for receiving SIBs using an MIB, determines scheduling information of SI using SIB1, and determines system information change section information and paging message reception information using SIB2.

The base station may change SI as indicated in system information change section information transmitted to the terminal via SIB2 as illustrated in FIG. 1.

FIG. 1 illustrates a system information change section of a conventional wireless communication system.

As illustrated in FIG. 1, a base station transmits an MIB, and SIB1~SIBN according to each scheduling information during an N-th system information change section 100. If system information changes, the base station informs a terminal of the system information change through a paging message during the N-th system information change section 100.

After that, the base station transmits changed MIB', and SIB'1~SIB'N according to each scheduling information during an (N+1)-th system information change section 110.

To be registered in a cell, a terminal requires essential system information of the cell. For example, in a case where the terminal is to be registered in a cell that uses an LTE technique, the terminal should obtain an MIB, SIB1, and SIB2, which are essential system information of the cell. However, when system information changes before the terminal receives SIB2, the terminal cannot receive the essential system information of the cell. That is, the terminal determines system information change section information and information for receiving a paging message using SIB2. Accordingly, the terminal cannot recognize a system information change section until SIB2 is received, and cannot receive a paging message.

When system information changes before the terminal receives SIB2, the terminal cannot recognize that the system information has changed, and accordingly, the terminal tries to receive SI using scheduling information obtained through SIB1 before the system information changes. Therefore, the terminal cannot receive SI. More particularly, in the case where the terminal cannot obtain SIB, which is essential system information of a cell, the terminal may designate a relevant cell as a barred cell.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for receiving changing system information in a mobile communication terminal.

Another aspect of the present invention is to provide an apparatus and a method for receiving all system information until validity of the system information is determined, and determining changing system information in a mobile communication terminal.

Still another aspect of the present invention is to provide an apparatus and a method for determining changing system information by receiving all system information until essential system information for camp-on is obtained in a mobile communication terminal.

Yet another aspect of the present invention is to provide an apparatus and a method for determining changing system information through a system information change section and paging message reception information obtained via SIB1 in a mobile communication terminal.

Further another aspect of the present invention is to provide an apparatus and a method for determining validity of system information using a paging message in a mobile communication terminal.

Even further aspect of the present invention is to provide an apparatus and a method for transmitting SIB1 including a system information change section and paging message reception information in a base station of a wireless communication system.

In accordance with an aspect of the present invention, a method for receiving system information in a mobile communication terminal is provided. The method includes receiving system information including scheduling information for at least one additional system information from a base station, determining whether validity of the system information is determinable, and if it is determined that the validity of the system information is not determinable, receiving again system information including scheduling information for at least one additional system information from the base station.

In accordance with another aspect of the present invention, a method for receiving system information in a mobile communication terminal is provided. The method includes receiving system information including scheduling information for at least one additional system information, and paging message reception information from a base station, determining whether validity of the system information is determinable, and if it is determined that the validity of the system information is not determinable, receiving again system information including scheduling information for at least one additional system information from the base station.

In accordance with still another aspect of the present invention, an apparatus of a mobile communication terminal, for receiving system information is provided. The apparatus includes a receiver for receiving a signal, a system information determination unit for determining system information from a signal received via the receiver, and a controller for, if it is determined that validity of system information including scheduling information for at least one additional system information determined by the system information determination unit is not determinable, controlling to receive again system information including scheduling information for additional system information.

In accordance with yet another aspect of the present invention, an apparatus of a mobile communication terminal, for receiving system information is provided. The apparatus includes a receiver for receiving a signal, a system information determination unit for determining system information from a signal received via the receiver, and a controller for, if it is determined that validity of system information including scheduling information for at least one additional system information and paging message reception information determined by the system information determination unit is not determinable, controlling to receive again system information including scheduling information for additional system information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

Figure 1:
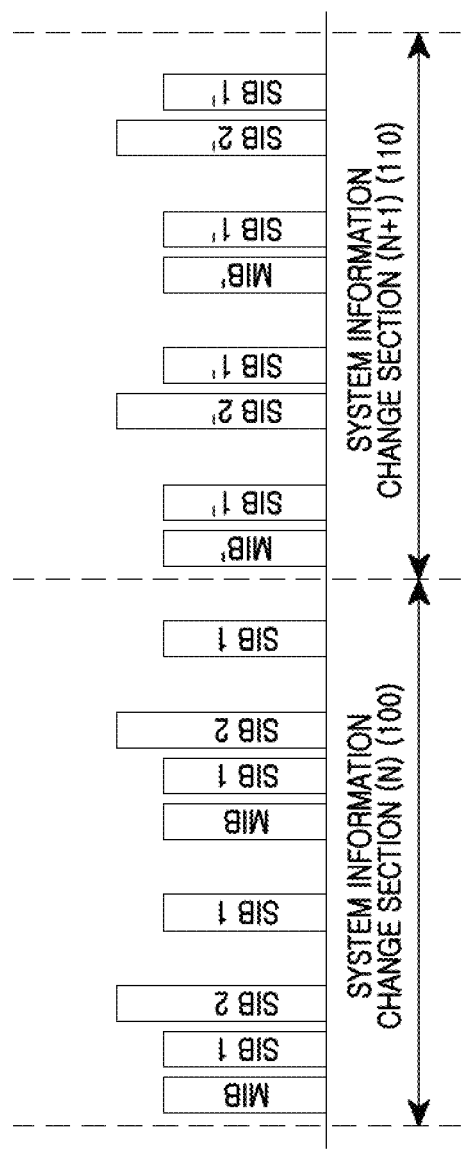
FIG. 1 is a view illustrating a system information change section of a conventional wireless communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for obtaining system information in a mobile communication terminal.

In the following description, it is assumed that a wireless communication system uses a communication technique defined by the LTE standard of 3GPP. Here, the system information includes an MIB, and SIB1~SIBN.

A base station performs scheduling on each of MIB and SIB1 as a transmission basis and transmits the same, and performs scheduling on each of SIB2~SIBN as a transmission basis called SI and transmits the same. For example, the base station transmits an MIB according to scheduling information fixed at a period of 40 ms, and retransmits the same MIB within 40 ms. That is, the base station initially transmits an MIB via a 0-th subframe of a frame where a System Frame Number (SFN) mod 4 is 0. After that, the base station retransmits an MIB via a 0-th subframe of frames that do not satisfy SFN mod 4.

In addition, the base station transmits an SIB1 according to scheduling information fixed at a period of 80 ms, and retransmits the same SIB1 within 80 ms. That is, the base station initially transmits an SIB1 via a 5-th subframe of a frame where SFN mod 8 is 0. After that, the base station retransmits an SIB1 via a 5-th subframe of a frame where SFN mod 2 is 0.

In addition, the base station transmits SIB2~SIBN according to scheduling information of variable SI included in an SIB1.

Figure 2:
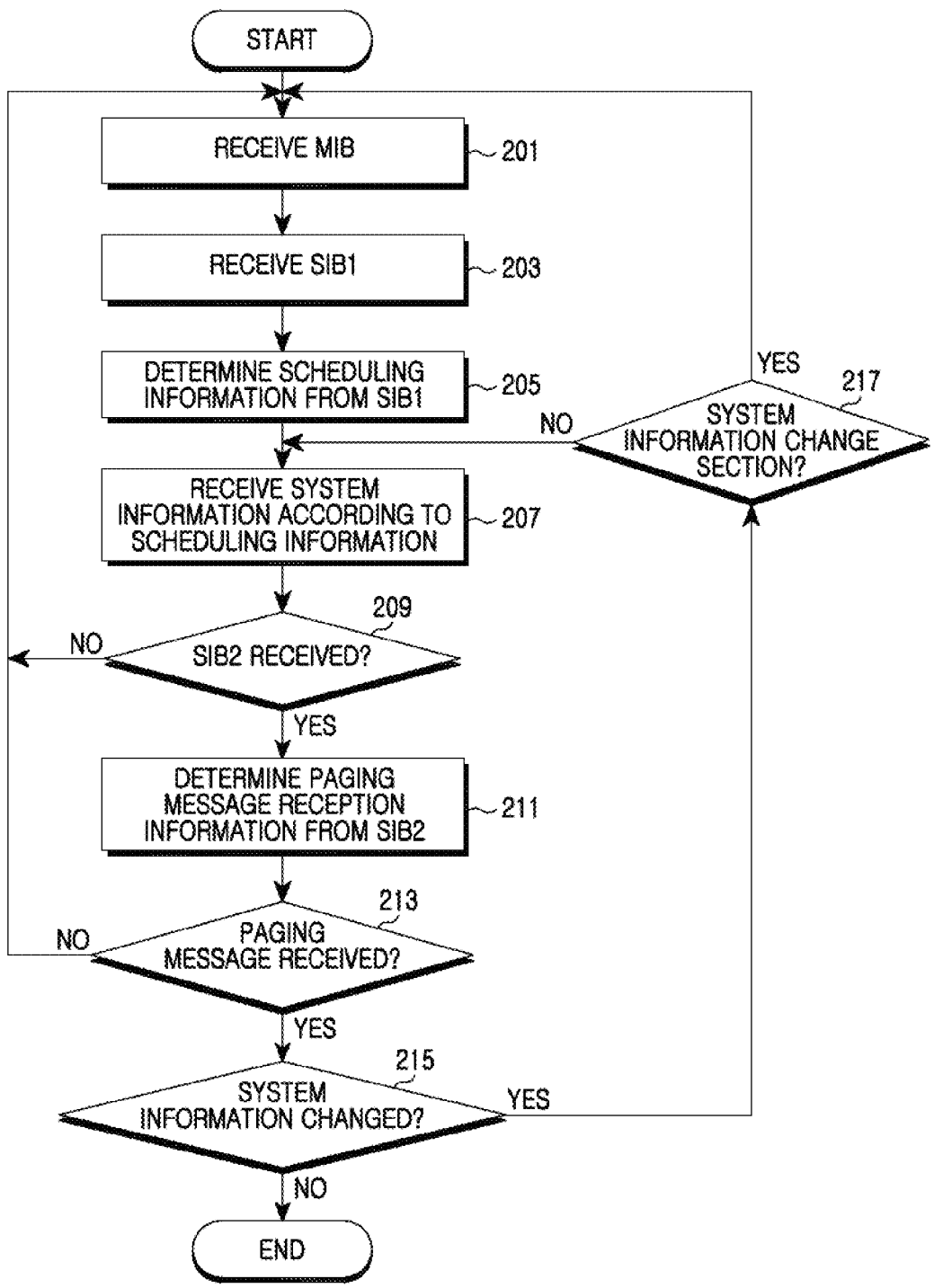
FIG. 2 is a flowchart illustrating a procedure for receiving system information in a wireless communication system according to an exemplary embodiment of the present invention.

As described above, in the case where the base station discriminates system information into an MIB, an SIB1, and SI, and transmits the same, a terminal receives system information of the base station as illustrated in FIG. 2.

FIG. 2 illustrates a procedure for receiving system information in a wireless communication system according to an exemplary embodiment of the present invention.

Referring to FIG. 2, a terminal receives an MIB from a base station according to fixed scheduling information via which the base station transmits the MIB in step 201. At this point, the terminal can determine information for receiving the SIB1 using the MIB.

In addition, the terminal receives an SIB1 from the base station according to fixed scheduling information via which the base station transmits the SIB1 in step 203.

After receiving the SIB1, the terminal determines scheduling information for SI included in the SIB1 in step 205. That is, the terminal determines scheduling information for SIB2~SIBN included in the SIB1.

After determining the scheduling information for the SI, the terminal proceeds to step 207 to receive the rest of the system information according to the scheduling information determined in step 205.

The terminal determines whether the SIB2 is received according to the scheduling information in step 209. For example, after receiving the SIB1 in step 203, the terminal determines whether the SIB2 is received until the next SIB1 is received.

If it is determined in step 209 that the SIB2 is not received within a preset time, the terminal returns to step 201 to receive again an MIB and an SIB1. That is, if it is determined that all essential system information for camp-on is not received from the base station, the terminal returns to step 201 to receive again the MIB and the SIB1. For example, the terminal can determine system information change section information and information for receiving a paging message using the SIB2. Therefore, when not receiving the SIB2, the terminal receives again the MIB and the SIB1 transmitted by the base station because the terminal is not able to determine whether the system information is valid. Here, the essential system information for camp-on includes an MIB, an SIB1, and an SIB2.

In contrast, if it is determined in step 209 that the SIB2 is received, the terminal determines a system information change section and paging message reception information included in the SIB2 in step 211.

After determining the paging message reception information in step 211, the terminal determines whether a paging message is received according to the paging message reception information in step 213. For example, the terminal receives the SIB1 in step 203, and then determines whether a paging message is received until the next SIB1 is received.

If it is determined in step 213 that a paging message is not received within a preset time, the terminal returns to step 201 to receive again an MIB and an SIB1. That is, the terminal can determine whether system information has changed using a paging message. Therefore, when not receiving a paging message, the terminal receives again the MIB and the SIB1 transmitted by the base station because the terminal is not able to determine whether the system information is valid.

In contrast, if it is determined in step 213 that a paging message is received, the terminal determines whether system information has changed using the paging message in step 215. That is, the terminal determines validity of system information received in steps 201, 203, and 207 using the paging message.

If it is determined in step 215 that system information provided from the base station is changed, the terminal determines whether the system information change section determined through the SIB2 arrives in step 217.

If it is determined in step 217 that the system information change section arrives, the terminal returns to step 201 to receive changed system information transmitted by the base station.

In contrast, if it is determined in step 217 that the system information change section does not arrive, the terminal returns to step 207 to receive the rest of the system information according to the scheduling information determined in step 205. That is, the base station changes system information on a system information change section basis. Therefore, when the system information change section does not arrive, the terminal receives the rest of the system information according to the scheduling information determined in step 205.

In contrast, if it is determined in step 215 that the system information is not changed, the terminal ends the present algorithm.

In the above-described exemplary embodiment of the present invention, if it is determined that the system information provided from the base station is not valid, the terminal returns to step 201 to receive again an MIB and an SIB1. In an exemplary embodiment of the present invention, if it is determined that the system information provided from the base station is not valid, the terminal returns to step 203 to receive again an SIB1.

In the above-described exemplary embodiment of the present invention, the terminal determines paging message reception information using an SIB2. After that, the terminal may determine validity of system information using a paging message provided from the base station according to the paging message reception information. In addition, the terminal continues to receive system information until validity of the system information is determined via the paging message.

In an exemplary embodiment of the present invention, the base station may add a system information change section and paging message reception information to an SIB1 and transmit the same. Therefore, the terminal can determine the paging message reception information determined via the SIB1 as illustrated in FIG. 3.

Figure 3:
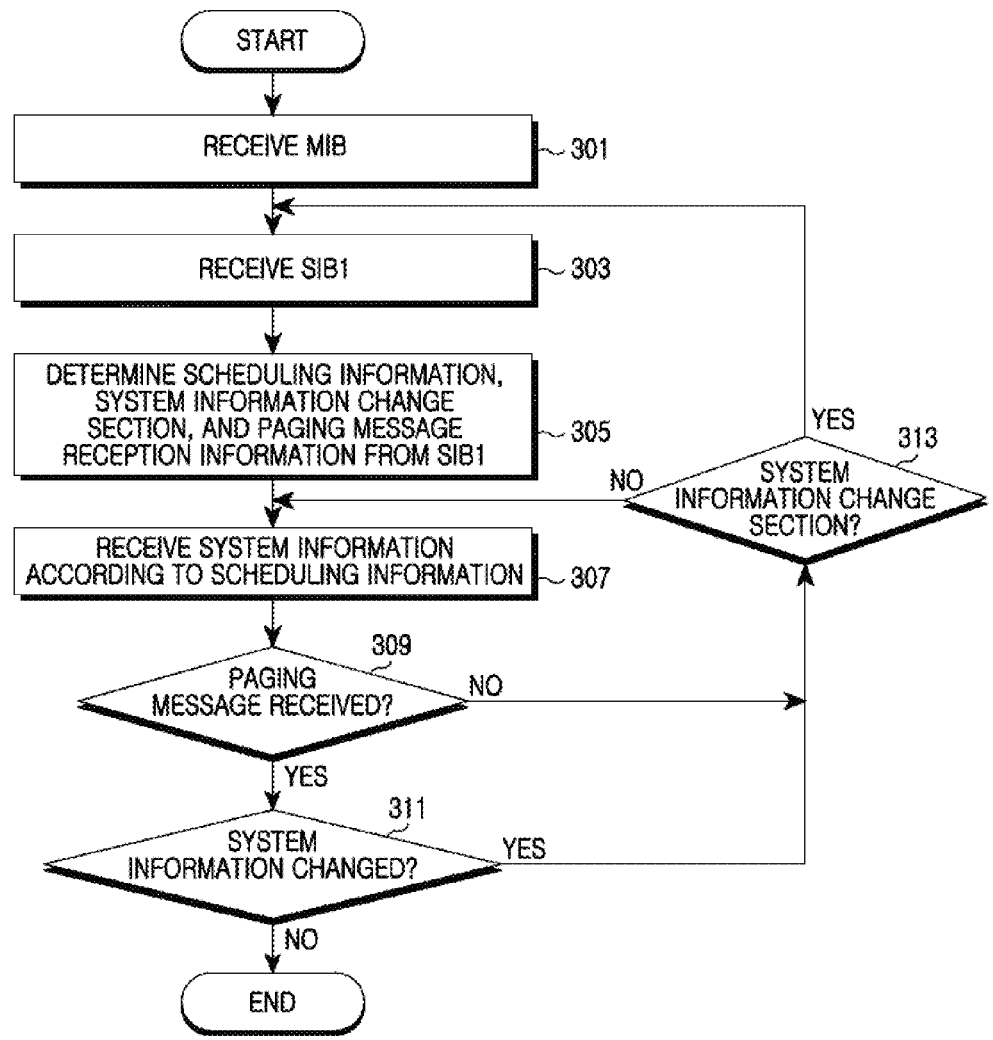
FIG. 3 is a flowchart illustrating a procedure for receiving system information in a wireless communication system according to an exemplary embodiment of the present invention.

FIG. 3 is a flowchart illustrating a procedure for receiving system information in a wireless communication system according to an exemplary embodiment of the present invention.

Referring to FIG. 3, a terminal receives an MIB from a base station according to fixed scheduling information via which the base station transmits the MIB in step 301.

The terminal receives an SIB1 from the base station according to fixed scheduling information via which the base station transmits the SIB1 in step 303.

After receiving the SIB1, the terminal determines scheduling information for SI, a system information change section, and paging message reception information included in the SIB1 in step 305.

After determining the scheduling information for SI, the terminal receives the rest of the system information according to the scheduling information in step 307.

The terminal determines whether a paging message is received according to the paging message reception information in step 309.

If it is determined in step 309 that a paging message is not received within a preset time, the terminal determines whether the determined system information change section arrives in step 313.

If it is determined in step 313 that the system information change section does not arrive, the terminal returns to step 307 to receive the rest of the system information according to the scheduling information determined in step 305. That is, the base station changes system information on a system information change section basis. Therefore, when the system information change section does not arrive, the terminal receives the rest of the system information according to the scheduling information determined in step 305.

In contrast, if it is determined in step 313 that the system information change section arrives, the terminal returns to step 303 to receive again an SIB1. That is, the terminal can determine whether the system information has changed using a paging message. Therefore, when not receiving a paging message, the terminal receives an SIB1 transmitted by a base station because the terminal is not able to sure whether the system information is valid.

In contrast, if it is determined in step 309 that a paging message is received, the terminal determines whether the system information has changed using the paging message in step 311. That is, the terminal determines validity of the system information provided from the base station using the paging message.

If it is determined in step 311 that the system information has changed, the terminal determines whether the system information change section determined via the SIB1 arrives in step 313.

If it is determined in step 313 that the system information change section does not arrive, the terminal returns to step 307 to receive the rest of the system information according to the scheduling information determined in step 305.

In contrast, if it is determined in step 313 that the system information change section arrives, the terminal returns to step 303 to receive again an SIB1.

In contrast, if it is determined in step 311 that the system information has not changed, the terminal ends the present algorithm.

In the above-described exemplary embodiment, when not determining validity of the received system information until a system information change section arrives, the terminal receives again an SIB1 from the base station.

In an exemplary embodiment of the present invention, when not determining validity of the received system information until the system information change section arrives, the terminal may receive again an MIB and an SIB1 from the base station.

In the above-described exemplary embodiment of the present invention, the terminal may determine validity of system information provided from the base station using a paging message.

When accessing again a previously accessed base station, the terminal may determine validity of system information of the base station stored in a value tag included in an SIB1.

Figure 4:
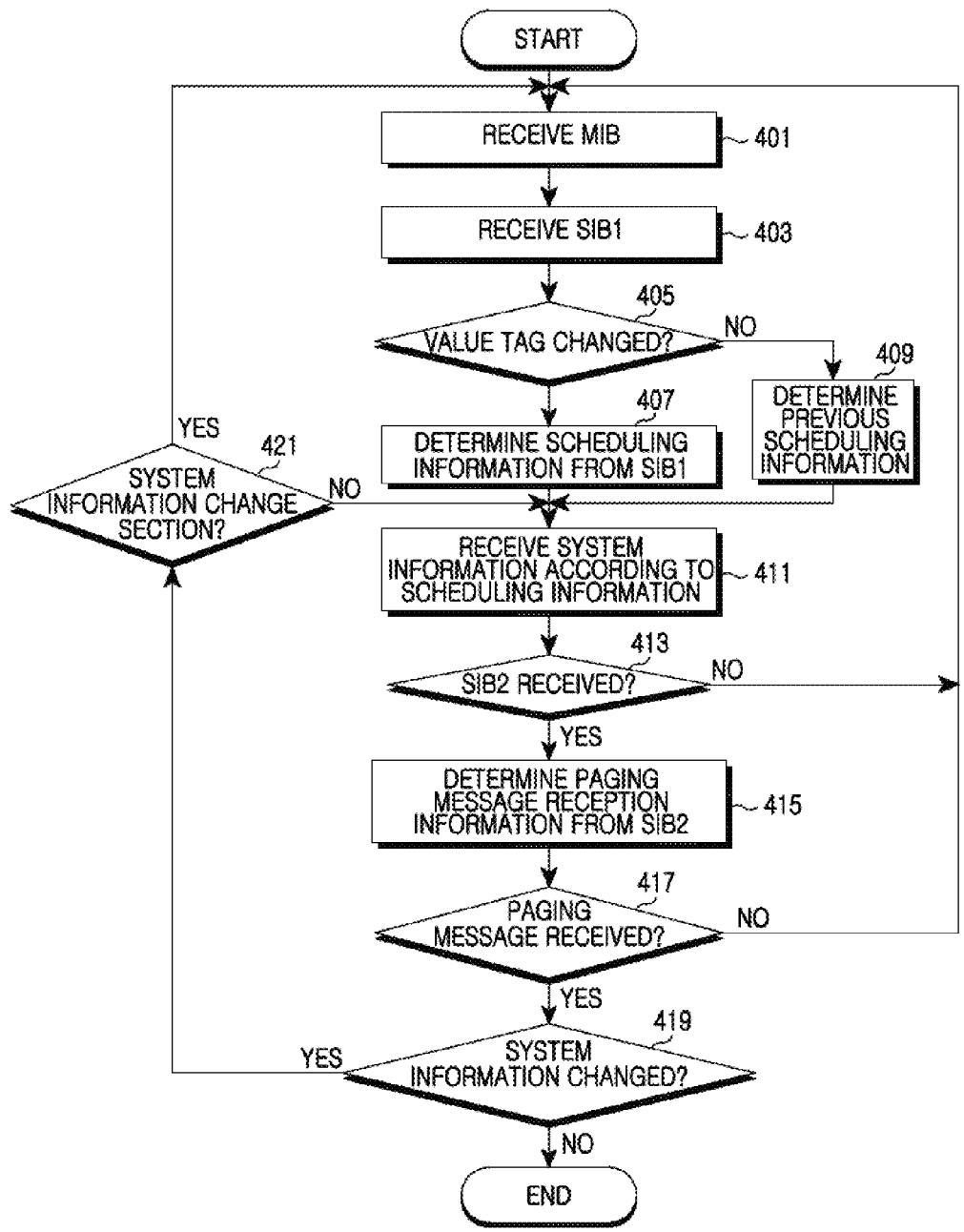
FIG. 4 is a flowchart illustrating a procedure for receiving system information in a wireless communication system according to an exemplary embodiment of the present invention.

FIG. 4 illustrates a procedure for receiving system information in a wireless communication system according to an exemplary embodiment of the present invention.

Referring to FIG. 4, a terminal receives an MIB from a base station according to fixed scheduling information via which the MIB is transmitted by the base station in step 401.

In addition, the terminal receives an SIB1 from the base station according to fixed scheduling information via which the SIB1 is transmitted by the base station in step 403.

After receiving the SIB1, the terminal determines whether system information stored in a value tag included in the SIB1 has changed in step 405.

If it is determined in step 405 that the system information has changed, the terminal determines scheduling information for SI included in the SIB1 in step 407. That is, the terminal determines the scheduling information via which SIB2~SIBN included in the SIB1 are to be received.

In contrast, if it is determined in step 405 that the system information has not changed, the terminal determines stored system information in step 409. That is, the terminal determines scheduling information for the stored SI.

After determining the scheduling information for the SI, the terminal receives the remaining system information according to the scheduling information in step 411.

The terminal determines whether an SIB2 is received according to the scheduling information of the SI in step 413.

For example, after receiving the SIB1 in step 403, the terminal determines whether an SIB2 is received until the next SIB1 is received.

If it is determined in step 413 that an SIB2 is not received within a preset time, the terminal returns to step 401 to receive again an MIB and an SIB1. That is, the terminal can determine system information change section information and information for receiving a paging message using an SIB2. Therefore, when not receiving an SIB2, the terminal receives again an MIB and an SIB1 transmitted by the base station because the terminal is not able to sure whether the system information is valid.

In contrast, if it is determined in step 413 that an SIB2 is received, the terminal determines a system information change section and paging message reception information included in the SIB2 in step 415.

After determining the paging message reception information, the terminal determines whether a paging message is received according to the paging message reception information in step 417. For example, after receiving an SIB1 in step 403, the terminal determines whether a paging message is received until the next SIB1 is received.

If it is determined in step 413 that a paging message is not received within a preset time, the terminal returns to step 401 to receive again an MIB and an SIB1. That is, the terminal can determine whether the system information has changed using a paging message. Therefore, when not receiving a paging message, the terminal receives again an MIB and an SIB1 transmitted by the base station because the terminal is not able to determine whether the system information is valid.

In contrast, if it is determined in step 413 that a paging message is received, the terminal determines whether the system information has changed using the paging message in step 419. That is, the terminal determines validity of the received system information using the paging message.

If it is determined in step 419 that the system information has changed, the terminal determines whether the system information change section determined via the SIB2 arrives in step 421.

If it is determined in step 421 that the system information change section arrives, the terminal returns to step 401 to receive changed system information transmitted by the base station.

In contrast, if it is determined in step 421 that the system information change section does not arrive, the terminal returns to step 411 to receive the rest of the system information according to the scheduling information determined in step 407 or step 409. That is, the base station changes system information on a system information change section basis. Therefore, when the system information change section does not arrive, the terminal receives the remaining system information according to the scheduling information determined in step 407 or step 409.

In contrast, if it is determined in step 419 that the system information has not changed, the terminal ends the present algorithm.

Hereinafter, a construction of a base station for transmitting system information is described.

Figure 5:
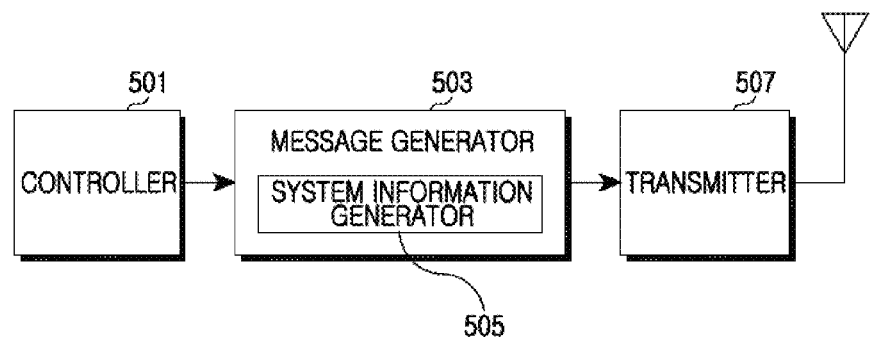
FIG. 5 is a block diagram illustrating a base station for transmitting system information in a wireless communication system according to an exemplary embodiment of the present invention.

FIG. 5 is a block diagram illustrating a base station for transmitting system information in a wireless communication system according to an exemplary embodiment of the present invention.

As illustrated in FIG. 5, the base station includes a controller 501, a message generator 503, and a transmitter 507. Furthermore, the message generator 503 includes a system information generator 505.

The controller 501 controls transmission of system information. For example, the controller 501 controls to initially transmit an MIB via a 0-th subframe of a frame where an SFN mod 4 is 0, and retransmit an MIB via 0-th subframes of frames that do not satisfy SFN mod 4. In addition, the controller 501 controls to initially transmit an SIB1 via a 5-th subframe of a frame where an SFN mod 8 is 0, and retransmit an SIB1 via a 5-th subframe of a frame where an SFN mod 2 is 0. In addition, the controller 501 performs scheduling for transmitting an SIB2 through an SIBN.

The message generator 503 generates a control message to be transmitted in order to provide a service. At this point, the message generator 503 includes the system information generator 505 to generate system information. For example, the system information generator 505 generates an MIB, and SIB1~SIBN. At this point, the system information generator 505 generates an SIB1 including scheduling information of SIB2~SIBN. For another example, the system information generator 505 may generate an SIB1 including scheduling information of SIB2~SIBN, a system information change section, and paging message reception information. For another example, the system information generator 505 may generate an SIB1 including a value tag representing change information for system information (MIB, SIB1~SIBN).

The transmitter 507 converts a control message, provided from the message generator 503, and data into a Radio Frequency (RF) signal, and outputs the same. For example, in an Orthogonal Frequency Division Multiplexing (OFDM) scheme, the transmitter 507 includes an encoder, an OFDM modulator, and an RF processor. The encoder encodes and modulates data or a control message to be transmitted to an upper node according to a relevant modulation level. The OFDM modulator converts a signal in a frequency domain provided from the encoder into a signal in a time domain by performing Inverse Fast Fourier Transform (IFFT). The RF processor converts a baseband signal provided from the OFDM modulator into an RF signal. Here, the modulation level includes a Modulation and Coding Scheme (MCS) level.

Hereinafter, a construction of a terminal for receiving system information is described.

Figure 6:
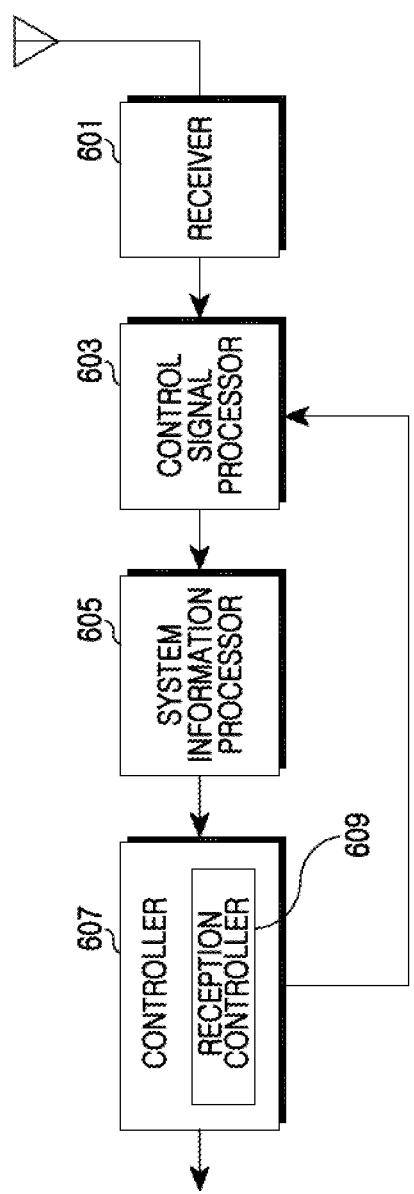
FIG. 6 is a block diagram illustrating a terminal for receiving system information in a wireless communication system according to an exemplary embodiment of the present invention.

FIG. 6 is a block diagram illustrating a terminal for receiving system information in a wireless communication system according to an exemplary embodiment of the present invention.

As illustrated in FIG. 6, a terminal includes a receiver 601, a control signal processor 603, a system information processor 605, and a controller 607. Furthermore, the controller 607 includes a reception controller 609.

The receiver 601 converts an RF signal received via an antenna into a baseband signal. For example, in an OFDM scheme, the receiver 601 includes an RF processor, an OFDM demodulator, and a decoder. The RF processor converts an RF signal received via the antenna into a baseband signal. The OFDM demodulator converts a signal in a time domain provided from the RF processor into a signal in a frequency domain by performing Fast Fourier Transform (FFT). The decoder demodulates and decodes a signal provided from the OFDM demodulator according to a relevant modulation level.

The control signal processor 603 detects a control message from a signal provided from the receiver 601. After that, the control signal processor 603 detects system information from the control message and outputs the system information to the system information processor 605.

The system information processor 605 analyzes system information provided from the control signal processor 603.

The controller 607 controls an operation of the terminal for receiving system information. In addition, the controller 607 controls the terminal to operate according to system information provided from the system information processor 605.

The controller 607 includes the reception controller 609 to control the control signal processor 603 to detect system information.

The reception controller 609 controls the control signal processor 603 to receive an MIB and an SIB1 transmitted by a base station according to fixed scheduling information. For example, when not determining validity of system information provided from the base station, the reception controller 609 controls the control signal processor 603 to constantly receive an MIB and an SIB1. At this point, when the system information provided from the base station is valid, the reception controller 609 controls the control signal processor 603 not to receive an MIB and an SIB1 until system information change by a paging message is determined. For another example, when not determining validity of system information provided from the base station, the reception controller 609 controls the control signal processor 603 to constantly receive an SIB1.

The reception controller 609 controls the control signal processor 603 to receive SIB2~SIBN according to the scheduling information determined via an SIB1.

The reception controller 609 controls the control signal processor 603 to receive a paging message according to paging message reception information determined via an SIB1 or an SIB2.

As described above, a mobile communication terminal can obtain system information and prevent a specific cell from being designated as a barred cell due to system information change by determining changing system information using an MIB and an SIB1.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving system information in a mobile communication terminal, the method comprising:
receiving system information comprising scheduling information for at least one additional system information from a base station;
determining whether validity of the system information is determinable; and receiving again system information comprising scheduling information for at least one additional system information from the base station, when it is determined that the validity of the system information is not determinable,
wherein the determining of whether validity of the system information is determinable comprises determining whether essential system information for camp-on is received using the scheduling information for additional system information included in the system information, and
determining that validity of the system information is not determinable when it is determined that the essential system information for camp-on is not received.

2. The method of claim 1, wherein the system information comprises at least one of a Master Information Block (MIB) and a System Information Block (SIB)1.

3. The method of claim 1, wherein the receiving of the system information comprises:

receiving an MIB from the base station;
determining reception information for at least one SIB via the MIB;
receiving an SIB1 using the reception information determined via the MIB; and
determining the scheduling information for at least one additional system information using the SIB1.

4. The method of claim 1, wherein the essential system information for camp-on comprises an MIB, an SIB1, and an SIB2, and the SIB2 comprises paging message reception information.

5. The method of claim 1, further comprising:
if it is determined that the essential system information for camp-on is received, determining paging message reception information from the essential system information for camp-on;
determining whether a paging message is received according to the paging message reception information; and
if it is determined that a paging message is not received, determining that the validity of the system information is not determinable.

6. The method of claim 5, further comprising:
if it is determined that a paging message is received, determining the validity of the system information using the paging message; and
if it is determined that the system information is not valid, receiving again system information comprising scheduling information for at least one additional system information from the base station.

7. The method of claim 1, further comprising:
after receiving the system information comprising the scheduling information for the additional system information, determining whether the received system information is changed using a value tag of an SIB1;
if it is determined that the system information is changed, determining scheduling information for additional system information using the system information; and
if it is determined that the system information is not changed, determining scheduling information for additional system information using system information received prior to the system information.

8. A method for receiving system information in a mobile communication terminal, the method comprising:
receiving system information comprising scheduling information for at least one additional system information, and paging message reception information from a base station;
determining whether validity of the system information is determinable; and
when it is determined that the validity of the system information is not determinable, receiving again system information comprising scheduling information for at least one additional system information from the base station,
wherein the determining of whether validity of the system information is determinable comprises determining whether a paging message is received according to the paging message reception information included in the received system information, and
determining that the validity of the system information is not determinable when it is determined that a paging message is not received.

9. The method of claim 8, wherein the system information comprises at least one of a Master Information Block (MIB) and a System Information Block (SIB)1.

10. The method of claim 8, further comprising:
if it is determined that a paging message is received, determining the validity of the system information using the paging message; and
if it is determined that the system information is not valid, receiving again system information comprising scheduling information for at least one additional system information and paging message reception information from the base station.

11. An apparatus for receiving system information in a mobile communication terminal, the apparatus comprising:
a receiver for receiving a signal;
a system information determination unit for determining system information from a signal received via the receiver; and
a controller for, when it is determined that validity of system information comprising scheduling information for at least one additional system information determined by the system information determination unit is not determinable, controlling to receive again system information comprising scheduling information for additional system information, and for determining whether the validity of the system information comprising the scheduling information for the additional system information is determinable according to whether essential system information for camp-on comprising an MIB, an SIB1, and an SIB2 comprising paging message reception information, is received, such that when the essential system information for camp-on is not received, the controller determines that the validity of the system information comprising the scheduling information for the additional system information is not determinable.

12. The apparatus of claim 11, wherein the controller determines whether validity of system information comprising at least one of a Master Information Block (MIB) and a System Information Block (SIB)1 is determinable.

13. The apparatus of claim 11, wherein the controller controls to receive an SIB1 according to reception information for at least one SIB determined via an MIB received from a base station, and controls to receive additional system information using scheduling information for at least one additional system information determined via the SIB1.

14. The apparatus of claim 11, wherein, if it is determined that the essential system information for camp-on is received, the controller determines whether a paging message is received according to the paging message reception information determined via the essential system information for camp-on, and
if it is determined that a paging message is not received, the controller determines that the validity of the system information is not determinable.

15. The apparatus of claim 14, wherein, if it is determined that a paging message is received, the controller determines the validity of the system information using the paging message, and
if it is determined that the system information is not valid, the controller controls to receive again system information comprising scheduling information for at least one additional system information from a base station.

16. The apparatus of claim 11, wherein, after receiving the system information comprising the scheduling information for the additional system information, the controller determines whether the received system information has changed using a value tag of an SIB1, if it is determined that the system information is changed, the controller determines scheduling information for additional system information using the system information, and if it is determined that the system information is not changed, the controller determines the scheduling information for the additional system information via system information received prior to the system information.

17. An apparatus for receiving system information in a mobile communication terminal, the apparatus comprising: a receiver for receiving a signal;

a system information determination unit for determining system information from a signal received via the receiver; and a controller for, when it is determined that validity of system information comprising scheduling information for at least one additional system information and paging message reception information determined by the system information determination unit is not determinable, controlling to receive again system information comprising scheduling information for additional system information, wherein, when it is determined that a paging message is not received according to the paging message reception information determined via the system information whose validity is determined, the controller determines that the validity of the system information is not determinable.

18. The apparatus of claim 17, wherein the controller determines whether validity of system information comprising at least one of a Master Information Block (MIB) and a System Information Block (SIB)1 is determinable.

19. The apparatus of claim 17, wherein, if it is determined that a paging message is received according to the paging message reception information determined via the system information whose validity is determined, the controller determines the validity of the system information using the paging message, and if it is determined that the system information is not valid, the controller controls to receive again system information comprising scheduling information for at least one additional system information from a base station.

* * * * *